(12) United States Patent
Flamm

(10) Patent No.: US 11,073,393 B2
(45) Date of Patent: Jul. 27, 2021

(54) CORIOLIS VIBRATORY GYROSCOPE CONTROL SYSTEM

(71) Applicant: Juergen Karl Peter Flamm, Woodland Hills, CA (US)

(72) Inventor: Juergen Karl Peter Flamm, Woodland Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 213 days.

(21) Appl. No.: 16/249,478

(22) Filed: Jan. 16, 2019

(65) Prior Publication Data

US 2020/0225039 A1 Jul. 16, 2020

(51) Int. Cl.
*G01C 19/5776* (2012.01)

(52) U.S. Cl.
CPC .................. *G01C 19/5776* (2013.01)

(58) Field of Classification Search
None
See application file for complete search history.

(56) References Cited

U.S. PATENT DOCUMENTS

| 4,968,989 A | 11/1990 | Olmstead et al. |
| 5,168,756 A | 12/1992 | Hulsing, II |
| 7,621,184 B2 | 11/2009 | Caron |
| 7,637,157 B2 * | 12/2009 | Chikovani ......... G01C 19/5691 73/504.13 |
| 7,874,209 B2 | 1/2011 | Stewart |
| 8,205,495 B2 * | 6/2012 | Challoner ......... G01C 19/5684 73/504.13 |

(Continued)

FOREIGN PATENT DOCUMENTS

| EP | 2697607 A1 | 2/2014 |
| JP | 2010066254 A | 3/2010 |
| JP | 2016156810 A | 9/2016 |

OTHER PUBLICATIONS

Ge et al. "Simultaneous Angular Rate Estimates Extracted from a Single Axisymmetric Resonator", IEEE Sensors Journal, vol. 17, No. 22, Nov. 2017, p. 7460-7469 (Year: 2017).*

(Continued)

*Primary Examiner* — Roy Y Yi
(74) *Attorney, Agent, or Firm* — Tarolli, Sundheim, Covell & Tummino LLP

(57) ABSTRACT

A control system includes sensor controllers that are each coupled to a respective set of electrodes of a CVG sensor system via respective sensor channels. A first portion of the sensor controllers provides a sinusoidal forcer signal on the respective sensor channel in response to digital clock and feedback signals to provide oscillation of a resonator of the CVG sensor system. A second portion of the sensor controllers monitors a capacitive pickoff voltage associated with the resonator on the respective sensor channel to generate a digital pickoff signal. A gyroscope controller generates the digital feedback signal in response to the digital pickoff signal from the second portion of the sensor controllers to provide the digital feedback signal and the digital clock signal to the first portion of the sensor controllers and determines a rotation about the CVG sensor system based on the digital feedback signal or the digital pickoff signal.

20 Claims, 4 Drawing Sheets

(56) References Cited

U.S. PATENT DOCUMENTS

| | | |
|---|---|---|
| 8,763,441 B2 | 7/2014 | Casinovi et al. |
| 9,534,897 B2 | 1/2017 | Liu |
| 9,702,697 B2 | 7/2017 | Stewart et al. |
| 10,228,264 B2 | 3/2019 | Trusov et al. |
| 10,584,967 B2 | 3/2020 | Trusov et al. |
| 2005/0092084 A1 | 5/2005 | Fell et al. |
| 2006/0248953 A1 | 11/2006 | Lynch et al. |
| 2007/0144255 A1 | 6/2007 | Handrich et al. |
| 2009/0158846 A1 | 6/2009 | Lignon et al. |
| 2011/0239763 A1 | 10/2011 | Shkel et al. |
| 2016/0084654 A1* | 3/2016 | Senkal .............. G01C 19/5726 73/502 |
| 2017/0153266 A1 | 6/2017 | Dao |
| 2017/0363423 A1 | 12/2017 | Dormody et al. |
| 2018/0017385 A1 | 1/2018 | Shirvani et al. |
| 2018/0156634 A1 | 6/2018 | Trusov |
| 2018/0231383 A1 | 8/2018 | Trusov et al. |
| 2021/0095962 A1 | 4/2021 | Stewart |

OTHER PUBLICATIONS

European Office Action for Application No. 20152073.4-1213 dated Jul. 1, 2020.
Final Office Action for U.S. Appl. No. 15/368,206 dated Jul. 11, 2019.
Japanese Office Action for Application No. 2017-201755 dated May 31, 2019.
Zurich Instruments: "Control of MEMS Coriolis Vibratory Gyroscopes"; found on the internet Jan. 9, 2019 at: https://www.zhinst.com/sites/default/files/zi_appnote_mems_gyroscope.pdf.
United States Office Action corresponding to U.S. Appl. No. 15/296,774, pp. 1-11, dated May 16, 2019.
Extended European Search Report for Application No. 20196367.5-1010 dated Feb. 4, 2021.

* cited by examiner

200

202 — MONITOR A CAPACITIVE PICKOFF VOLTAGE ASSOCIATED WITH OSCILLATORY MOTION OF A RESONATOR OF A CVG SENSOR SYSTEM VIA AT EACH OF A FIRST PORTION OF A PLURALITY OF SENSOR CONTROLLERS THAT ARE COUPLED TO A RESPECTIVE SET OF ELECTRODES ASSOCIATED WITH THE CVG SENSOR SYSTEM VIA A RESPECTIVE FIRST PORTION OF A PLURALITY OF SENSOR CHANNELS TO GENERATE A DIGITAL PICKOFF SIGNAL

204 — GENERATE A DIGITAL FEEDBACK SIGNAL BASED ON THE DIGITAL PICKOFF SIGNAL RECEIVED VIA EACH OF THE FIRST PORTION OF THE PLURALITY OF SENSOR CONTROLLERS

206 — PROVIDE THE DIGITAL FEEDBACK SIGNAL AND A DIGITAL CLOCK SIGNAL TO EACH OF A SECOND PORTION OF THE PLURALITY OF SENSOR CONTROLLERS TO GENERATE A SINUSOIDAL FORCER SIGNAL ON THE RESPECTIVE SECOND PORTION OF THE PLURALITY OF SENSOR CHANNELS TO PROVIDE THE OSCILLATORY MOTION OF THE RESONATOR

208 — DETERMINE A ROTATION ABOUT THE CVG SENSOR SYSTEM BASED ON AT LEAST ONE OF THE DIGITAL FEEDBACK SIGNAL AND THE DIGITAL PICKOFF SIGNAL

FIG. 5

CORIOLIS VIBRATORY GYROSCOPE CONTROL SYSTEM

TECHNICAL FIELD

This disclosure relates generally to sensor systems, and specifically to a Coriolis Vibratory Gyroscope (CVG) control system.

BACKGROUND

There are a number different types of gyroscope systems that are configured to calculate rotation about a sensitive (e.g., input) axis. One type of gyroscope is a Coriolis vibratory gyroscope (CVG). Examples of CVGs include tuning fork gyroscopes, Hemispheric Resonator Gyroscope (HRG), and/or vibrating mass gyroscopes. CVGs are typically operated in a manner that includes providing a forcing signal to one or more electrodes to initiate an oscillatory motion of a resonator, which can be vibrating tines of a tuning fork gyroscope, a "wine glass" shaped resonator of an HRG, or vibrating masses of a vibrating mass gyroscope. The CVG control system can monitor a pickoff voltage associated with pickoff electrodes (e.g., in a capacitive manner) to monitor the oscillatory motion of the resonator(s). Therefore, changes in the pickoff voltage, such as with respect to phase and/or frequency, can be indicative of rotation of the CVG about the sensitive axis. For example, the CVG control system can change the amplitude and/or phase of the forcing signal in a rebalance manner to counteract the change in the pickoff voltage, and thus to determine the rotation of the CVG about the input axis.

SUMMARY

One example includes a control system. The system includes sensor controllers that are each coupled to a respective set of electrodes of a CVG sensor system via respective sensor channels. A first portion of the sensor controllers provides a sinusoidal forcer signal on the respective sensor channel in response to digital clock and feedback signals to provide oscillation of a resonator of the CVG sensor system. A second portion of the sensor controllers monitors a capacitive pickoff voltage associated with the resonator on the respective sensor channel to generate a digital pickoff signal. A gyroscope controller generates the digital feedback signal in response to the digital pickoff signal from the second portion of the sensor controllers to provide the digital feedback signal and the digital clock signal to the first portion of the sensor controllers and determines a rotation about the CVG sensor system based on the digital feedback signal or the digital pickoff signal.

Another example includes a method for controlling a CVG system. The method includes monitoring a capacitive pickoff voltage associated with oscillatory motion of a resonator of a CVG sensor system at each of a first portion of a plurality of sensor controllers that are coupled to a respective set of electrodes associated with a CVG sensor system via a respective first portion of a plurality of sensor channels to generate a digital pickoff signal. The method also includes generating a set of digital feedback signals based on the digital pickoff signal received via each of the first portion of the plurality of sensor controllers. The method also includes providing a digital feedback signal and a digital clock signal to each of a second portion of the plurality of sensor controllers to generate a sinusoidal forcer signal on the respective second portion of the plurality of sensor channels to provide the oscillatory motion of the resonator. The method further includes determining a rotation about the CVG sensor system based on at least one of the digital feedback signal and the digital pickoff signal.

Another example includes a CVG control system. The system includes a plurality of pickoff/forcer controllers that are each coupled to a respective set of electrodes associated with a CVG sensor system via one of a respective plurality of sensor channels. A first portion of the plurality of pickoff/forcer controllers can be configured to provide a sinusoidal forcer signal on the respective one of the plurality of sensor channels in response to a digital clock signal and a digital feedback signal to provide oscillation of a resonator associated with the CVG sensor system in a forcer mode. A second portion of the plurality of pickoff/forcer controllers can be configured to monitor a capacitive pickoff voltage associated with the resonator of the CVG sensor system on the respective one of the plurality of sensor channels to generate a digital pickoff signal in a sensing mode. The system also includes a gyroscope controller configured to generate the digital feedback signal in response to the digital pickoff signal from the second portion of the plurality of pickoff/forcer controllers and to provide the digital feedback signal and the digital clock signal to the first portion of the plurality of pickoff/forcer controllers, to determine a rotation about the CVG sensor system based on at least one of the digital feedback signal and the digital pickoff signal, and to selectively switch the plurality of pickoff/forcer controllers between the forcer mode and the sensing mode.

BRIEF DESCRIPTION OF THE DRAWINGS

FIG. 5 illustrates an example of a method for controlling a CVG system.

DETAILED DESCRIPTION

Figure 1:
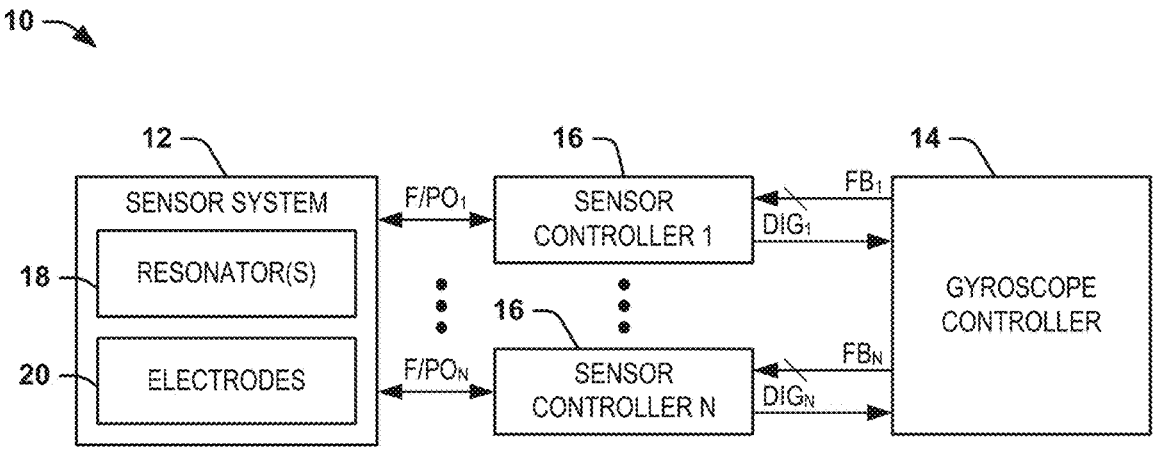
FIG. 1 illustrates an example of a Coriolis vibratory gyroscope (CVG) system.

This disclosure relates generally to sensor systems, and specifically to a Coriolis vibratory gyroscope (CVG) control system. The control system can include a plurality of sensor controllers that are each coupled to a respective sensor channel of a CVG sensor system. For example, the CVG sensor system can correspond to any of a variety of different types of CVG sensors (e.g., a tuning fork gyroscope, a vibrating mass gyroscope, a hemispherical resonator gyroscope (HRG)) that includes sets of opposing electrodes that can be stimulated to provide oscillatory motion of a resonator. The sensor channels can thus correspond to one or more conductors that interconnect the respective sensor controller and one or more sets of electrodes arranged along an axis of the oscillatory motion of the resonator. A first portion of the sensor controllers can correspond to one or more forcer mode controllers that are each configured to provide a sinusoidal forcer signal that is provided to the respective set of electrodes via the respective sensor channel to provide the oscillatory motion of the resonator. A second portion of the sensor controllers can correspond to one or more sensing mode controllers that are configured to monitor a capacitive pickoff voltage from the respective set of electrodes that is arranged off-axis (e.g., orthogonal) with respect to the forcer electrodes via the respective sensor channel to monitor the oscillatory motion of the resonator.

As an example, the first portion of the sensor controllers can include a field-programmable gate array (FPGA) that generates a sinusoidal signal via a capacitor array in response to a variable reference voltage generator, and includes a variable gain stage to generate the sinusoidal forcer signal that is provided to the CVG sensor channel. The variable reference voltage generator and the variable gain stage can be controlled via the digital feedback signal, such as based on respective fine and coarse portions of the digital feedback signal. As another example, the second portion of the sensor controllers can include a first amplifier stage that is coupled to the respective sensor channel to monitor the capacitive pickoff voltage, and can further include at least one additional variable gain stage configured to amplify the capacitive pickoff voltage in response to a digital gain control signal to generate a digital pickoff signal via an analog-to-digital converter (ADC). As an example, the variable gain control signal can be provided from a gyroscope controller to alternate between a high-gain and a low-gain state based on detecting saturation of the ADC. The digital pickoff signal can be implemented by the gyroscope controller to provide the digital feedback signal to generate the sinusoidal forcer signal via the first portion of the sensor controllers.

As an example, each of the sensor controllers can be configured as pickoff/forcer controllers that are arranged substantially the same with respect to each other. For example, each of the pickoff/forcer stages can include a gain stage for monitoring the capacitive pickoff signal at the respective sensor channel and converting the capacitive pickoff signal into the digital control signal via the ADC, and can include a forcer stage that includes the FPGA for generating the forcer sinusoidal signal to the respective sensor channel (e.g., via the first amplifier stage of the gain stage). Therefore, the gyroscope controller can operate the first portion of the pickoff/forcer controllers in a forcer mode to provide the sinusoidal forcer signal(s) and can operate the second portion of the pickoff/forcer controllers in a sensing mode to monitor the pickoff signal and generate the digital control signal in response. As an example, the gyroscope controller can be configured to selectively switch the pickoff/forcer controllers between the forcer mode and the sensing mode, such as during normal operation and/or to perform a calibration of the CVG sensor system.

FIG. 1 illustrates an example of a Coriolis vibratory gyroscope (CVG) system 10. The CVG system 10 can be implemented in any of a variety of applications with which accurate measurement of rotation may be necessary, such as aerospace navigation (e.g., in space environment). The CVG system 10 includes a sensor system 12, a gyroscope controller 14, and a plurality N of sensor controllers 16, where N is a positive integer greater than one.

The sensor system 12 can be arranged as any of a variety of different types of CVG sensor systems, such as a tuning fork gyroscope, a vibrating mass gyroscope, or a hemispherical resonator gyroscope (HRG), that includes one or more resonators 18 that can be induced to move in an oscillatory manner. The sensory system 12 includes sets of electrodes 20 that can be arranged along at least two axes (e.g., orthogonal with respect to each other). For example, the electrodes 20 can include first electrodes provided as two sets of electrodes 20 that are arranged orthogonally with respect to each other, and can also include second electrodes 20 provided as two sets of electrodes 20 that are arranged orthogonally with respect to each other and at 45° relative to the first electrodes 20. Each of the sets of electrodes 20 can correspond to a respective one of N sensor channels 22 on which a forcer signal can be provided or from which a capacitive pickoff voltage can be monitored, as described in greater detail herein. As described herein, a sensor channel 22 corresponds to one or more conductors that interconnect a respective one of the sensor controllers 16 one or more sets of the electrodes 20 of the sensor system 12 arranged along an axis of the oscillatory motion of the resonator 18.

The sensor controllers 16 can each be configured to provide a sinusoidal forcer signal "F" on a respective one of the sensor channels 22 to a set of the electrodes 20 of the sensor system 12 to provide the oscillatory motion of the resonator 18, or can monitor a capacitive pickoff voltage "PO" from one of the sets of electrodes 20 via the respective one of the sensor channels 22. In the example of FIG. 1, the sensor channels 22 are demonstrated as propagating signals "F/PO" to indicate that the sensor channels 22 can be implemented to either propagate a sinusoidal forcer signal F or propagate a pickoff voltage PO. As an example, a first portion of the sensor controllers 16 can correspond to one or more forcer mode controllers that are each configured to provide the sinusoidal forcer signal F via the respective sensor channel(s) 22, and a second portion of the sensor controllers 16 can correspond to one or more sensing mode controllers that are configured to monitor the capacitive pickoff voltage PO from the respective set of electrodes 20 that is arranged off-axis (e.g., orthogonal) with respect to the forcer electrodes 20 via the respective sensor channel 16.

As an example, the first portion of the sensor controllers 16 can include a field-programmable gate array (FPGA) that generates a sinusoidal signal via a capacitor array in response to a variable reference voltage generator, and includes a variable gain stage to generate the sinusoidal forcer signal F that is provided to the respective electrodes 20 via the sensor channel(s) 22. As an example, the capacitor array can be arranged with sinusoidal weighting with respect to capacitance values to generate the sinusoidal signal. The variable reference voltage generator and the variable gain stage can be controlled via a digital feedback signal, demonstrated in the example of FIG. 1 as a signal "FB". For example, the digital feedback signal FB can include a fine adjust portion and a coarse adjust portion to adjust the variable reference voltage and the variable gain, respectively.

As another example, the second portion of the sensor controllers 16 can include a first amplifier stage that is coupled to the respective sensor channel 22 to monitor the capacitive pickoff voltage PO. The second portion of the sensor controllers 16 can also include at least one additional variable gain stage configured to amplify the capacitive pickoff voltage PO, such as in response to a digital gain control signal, to generate a digital pickoff signal via an analog-to-digital converter (ADC). In the example of FIG. 1, the digital pickoff signal is demonstrated as a signal DIG. The digital pickoff signal DIG can be implemented by the gyroscope controller 14 to generate the digital feedback signal FB that is provided to the respective first sensor controller(s) 16 that are associated with the orthogonal axis of oscillatory motion of the resonator(s) 18 to generate the sinusoidal forcer signal F.

Figure 2:
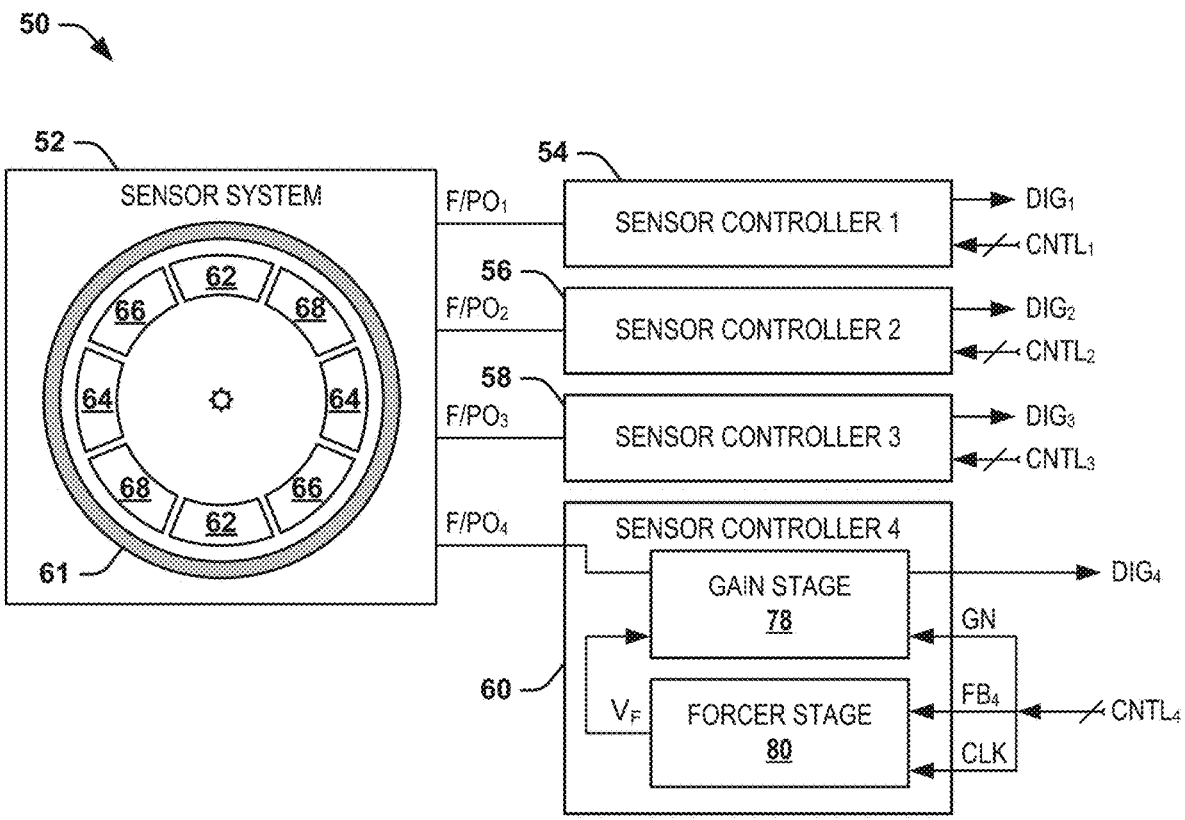
FIG. 2 illustrates another example of a CVG system.
Figure 3:
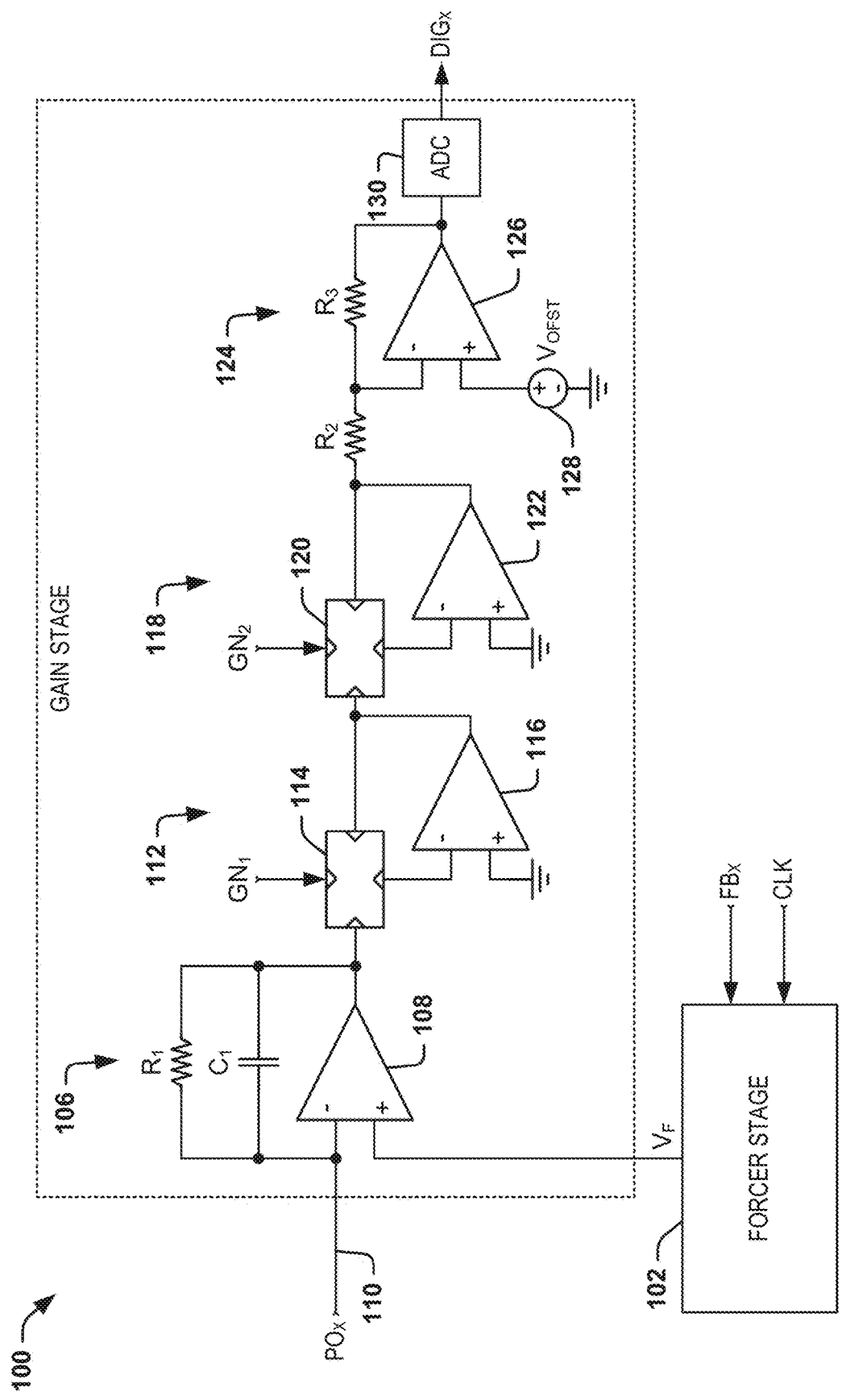
FIG. 3 illustrates an example of a gain stage.
Figure 4:
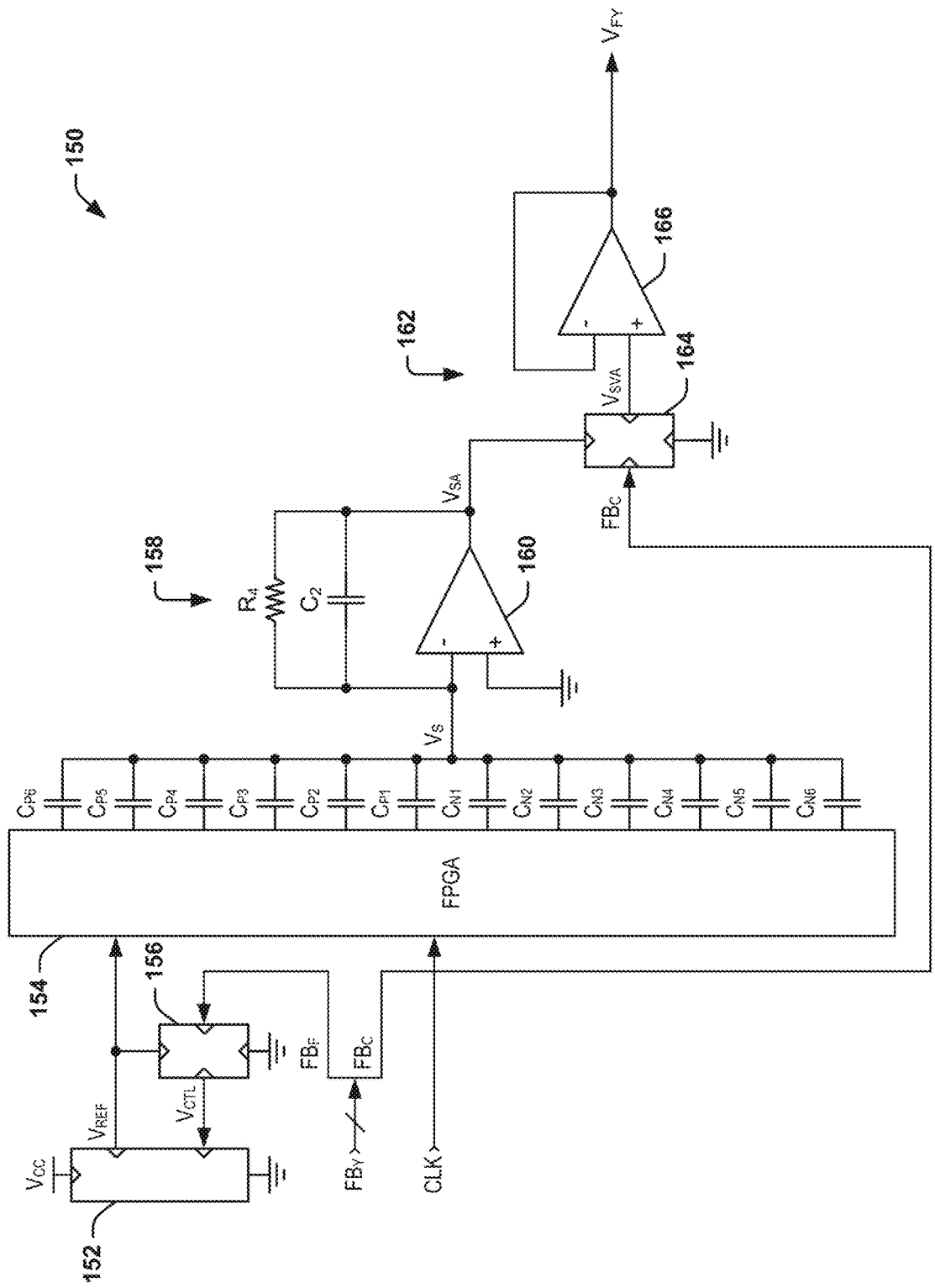
FIG. 4 illustrates an example of a forcer stage.

As an example, and as demonstrated in greater detail in the example of FIGS. 2-4, each of the sensor controllers 16 can be configured as pickoff/forcer controllers that are arranged substantially the same with respect to each other.

FIG. 2 illustrates another example of a CVG system 50. The CVG system 50 can correspond to another example of the CVG system 10 in the example of FIG. 1. The CVG system 50 can therefore be implemented in any of a variety of applications with which accurate measurement of rotation may be necessary, such as aerospace navigation (e.g., in space environment).

The CVG system 50 includes a sensor system 52, as well as a plurality of sensor controllers, demonstrated in the example of FIG. 2 as a first sensor controller 54, a second sensor controller 56, a third sensor controller 58, and a fourth sensor controller 60. In the example of FIG. 2, the sensor system 52 is demonstrated as an HRG having an annular resonator 61. However, as described previously in the example of FIG. 1, the sensor system 52 can instead be arranged as any of a variety of different types of CVG sensor systems that includes one or more resonators that can be induced to move in an oscillatory manner. In the example of FIG. 2, the sensory system 52 also includes a first set of electrodes 62 and a second set of electrodes 64 that are arranged orthogonally with respect to each other. The sensor system also includes a third set of electrodes 66 and a fourth set of electrodes 68 that are arranged orthogonally with respect to each other, and are arranged at 45° relative to the first set of electrodes 62 and the second set of electrodes 64.

The sensor system 52 is coupled to the first sensor controller 54 via a first sensor channel 70. As an example, the first sensor channel 70 can be conductively coupled to the first set of electrodes 62. The sensor system 52 is coupled to the second sensor controller 56 via a second sensor channel 72. As an example, the second sensor channel 72 can be conductively coupled to the second set of electrodes 64. The sensor system 52 is coupled to the third sensor controller 58 via a third sensor channel 74. As an example, the third sensor channel 74 can be conductively coupled to the third set of electrodes 66. The sensor system 52 is coupled to the fourth sensor controller 60 via a fourth sensor channel 76. As an example, the fourth sensor channel 76 can be conductively coupled to the fourth set of electrodes 68. In the example of FIG. 2, each of the sensor controllers 54, 56, 58, and 60 can generate a digital pickoff signal DIG that is provided to the gyroscope controller, and receives a set of digital control signals CNTL from the gyroscope controller 14. The set of digital control signals CNTL can include a digital gain control signal GN, a digital feedback signal FB, and a digital clock signal CLK.

As described previously, each of the sensor controllers 54, 56, 58, and 60 can be configured substantially the same with respect to each other. Therefore, each of the sensor controllers 54, 56, 58, and 60 can be configured to operate in a forcer mode or a sensing mode at a given time. In the example of FIG. 2, the fourth sensor controller 60 is demonstrated in an exploded view to demonstrate that each of the sensor controllers 54, 56, 58, and 60 includes a gain stage 78 and a forcer stage 80. As an example, the gyroscope controller 14 can selectively control the sensor controllers 54, 56, 58, and 60 to operate in one of the forcer and sensing modes.

In the example of FIG. 2, the forcer stage 80 can be configured to generate a sinusoidal forcer voltage $V_F$ that is provided to the gain stage 78 to generate the sinusoidal forcer signal F that is provided on a respective one of the sensor channels 70, 72, 74, and 76. For example, the sinusoidal forcer voltage $V_F$ can be generated in response to digital feedback signal FB and the digital clock signal CLK, such as via an FPGA and a capacitor array. Therefore, the sensor controllers 54, 56, 58, and 60 that operate in the forcing mode can provide a sinusoidal forcer signal F on a respective one of the sensor channels 70, 72, 74, and 76 to a respective one of the sets of electrodes 62, 64, 66, and 68 of the sensor system 52 to provide the oscillatory motion of the resonator 61. The gain stage 78 can be configured to generate the digital pickoff signal DIG in response to the capacitive pickoff voltage PO that is provided from one of the sets of electrodes 62, 64, 66, and 68 via the respective one of the sensor channels 70, 72, 74, and 76 in response to the oscillatory motion of the resonator 61. The digital pickoff signal DIG can thus be implemented by the gyroscope controller 14 to generate the set of digital control signals CNTL (e.g., including the digital gain control signal GN, the digital feedback signal FB, and to implement phase control of the digital clock signal CLK). Therefore, the sensor controllers 54, 56, 58, and 60 that operate in the sensing mode can provide the digital pickoff signals DIG in response to the capacitive pickoff voltage PO resulting from the oscillatory motion of the resonator 61.

As an example, the gyroscope controller 14 can designate that the first and third sensor controllers 54 and 58 operate in the forcer mode at a given time, and that the second and fourth sensor controllers 56 and 60 operate in the sensing mode at the given time. Therefore, the forcer stages 80 of the sensor controllers 54 and 58 can each provide respective sinusoidal forcer signals F1 and F3 on the respective sensor channels 70 and 74 to generate an electrostatic force on the respective sets of electrodes 62 and 66 to provide the oscillatory motion of the resonator 61 during the given time. Concurrently, the gain stages 78 of the sensor controllers 56 and 60 can monitor the respective capacitive pickoff voltages $PO_2$ and $PO_4$ provided on the respective sensor channels 72 and 76 from the respective electrodes 64 and 68 resulting from the oscillatory motion of the resonator 61 to generate the respective digital pickoff signals $DIG_2$ and $DIG_4$.

Upon conclusion of the given time, for example, the gyroscope controller 14 can switch the modes, such that the gyroscope controller 14 could then designate that the first and third sensor controllers 54 and 58 operate in the sensing mode, and that the second and fourth sensor controllers 56 and 60 could operate in the forcing mode. Therefore, the forcer stages 80 of the sensor controllers 56 and 60 can each provide respective sinusoidal forcer signals F2 and F4 on the respective sensor channels 72 and 76 to generate an electrostatic force on the respective sets of electrodes 64 and 68 to provide the oscillatory motion of the resonator 61. Concurrently, the gain stages 78 of the sensor controllers 54 and 58 can monitor the respective capacitive pickoff voltages $PO_1$ and $PO_3$ provided on the respective sensor channels 70 and 74 from the respective electrodes 62 and 66 resulting from the oscillatory motion of the resonator 61 to generate the respective digital pickoff signals $DIG_1$ and $DIG_3$.

FIG. 3 illustrates an example of a sensor system 100. The sensor system 100 is designated as the Xth sensor system of the plurality N of sensor systems 16 in the example of FIG. 1, and can correspond to any of the sensor systems 54, 56, 58, and 60 in the example of FIG. 2. Therefore, reference is to be made to the examples of FIGS. 1 and 2 in the following description of the example of FIG. 3.

The sensor system 100 includes a forcer stage 102 and a gain stage 104. The forcer stage 102 is demonstrated as generating a sinusoidal forcer voltage $V_F$ in response to a digital feedback signal $FB_X$ and a digital clock signal CLK. Similar to as described previously, the gyroscope controller 14 can provide the digital clock signal CLK to the forcer stage 102 and can also generate and provide the feedback signal $FB_X$ to forcer stage 102. The forcer stage 102 can generate the sinusoidal forcer voltage $V_F$ that is provided to the gain stage 104 in the forcer mode of the sensor system 100. For example, the gyroscope controller 14 can set the sensor system 100 to the forcer mode by providing the clock signal CLK to the forcer stage 102, as described in greater detail herein.

The gain stage 104 includes a first amplifier stage 106 that includes an operational amplifier (OP-AMP) 108. The first amplifier stage 106 includes a resistor $R_1$ and a capacitor $C_1$ arranged in a feedback arrangement between an output and an inverting input of the OP-AMP 108. The first amplifier stage 106 is coupled to a respective one of the sensor channels 110 at a non-inverting input of the OP-AMP 108, and is therefore configured to provide an amplified version of the corresponding capacitive pickoff voltage $PO_X$, as provided on the respective sensor channel 110. In the example of FIG. 3, the amplified pickoff voltage is demonstrated as a signal $V_{FA}$.

The amplified pickoff voltage $V_{FA}$ is provided to a first variable amplifier stage 112 that includes a first digital potentiometer 114 and an OP-AMP 116. The first digital potentiometer 114 is arranged in a feedback arrangement between an output and an inverting input of the OP-AMP 116, such that the first digital potentiometer 114 provides a gain voltage $V_{G1}$ to the inverting input of the OP-AMP 116, and the non-inverting input of the OP-AMP 116 is grounded. The first digital potentiometer 114 provides the gain voltage $V_{G1}$ in response to a first digital gain signal $GN_1$. As an example, the first digital gain control signal $GN_1$ can correspond to a first portion of the digital gain control signal GN demonstrated in the example of FIG. 2. Therefore, the first digital potentiometer 114 is provided as a voltage-divider between the output of the OP-AMP 108 and the OP-AMP 116 to provide a second amplified pickoff voltage $V_{FVA1}$ from the first variable amplifier stage 112.

The second amplified pickoff voltage $V_{FVA1}$ is provided to a second variable amplifier stage 118 that includes a second digital potentiometer 120 and an OP-AMP 122. The second digital potentiometer 120 is arranged in a feedback arrangement between an output and an inverting input of the OP-AMP 122, such that the second digital potentiometer 120 provides a gain voltage $V_{G2}$ to the inverting input of the OP-AMP 122, and the non-inverting input of the OP-AMP 122 is grounded. The second digital potentiometer 120 provides the gain voltage $V_{G2}$ in response to a second digital gain signal $GN_2$. As an example, the second digital gain control signal $GN_2$ can correspond to a second portion of the digital gain control signal GN demonstrated in the example of FIG. 2. Therefore, the second digital potentiometer 120 is provided as a voltage-divider between the output of the OP-AMP 116 and the OP-AMP 122 to provide a third amplified pickoff voltage $V_{FVA2}$ from the second variable amplifier stage 118.

The gain stage 104 also includes an offset amplifier stage 124 that is separated from the second variable gain amplifier stage 118 via a resistor R2. The offset amplifier stage 124 includes an OP-AMP 126 and a resistor $R_3$ that is arranged in a feedback arrangement between an output and an inverting input of the OP-AMP 126. The offset amplifier stage 124 also includes a voltage source 128 that provides an offset voltage $V_{OFST}$ to the non-inverting input of the OP-AMP 126. Therefore, the offset amplifier stage 124 provides a fourth amplified pickoff voltage $V_{FVA3}$ to an ADC 130 that is configured to provide the corresponding respective digital pickoff signal $DIG_X$ in the sensing mode. Therefore, the offset amplifier stage 124 is configured to provide the fourth amplified pickoff voltage $V_{FVA3}$ as a level-shifted voltage to that is centered at an approximate center of an amplitude range of the ADC 130 to facilitate a non-differential output amplitude of the ADC 130. As an example, when the sensor system 100 is set to the forcer mode (e.g., based on the clock signal CLK being provided to the forcer stage 102), the gyroscope controller 14 can ignore the digital pickoff signal $DIG_X$.

As demonstrated in the example of FIG. 1, the digital gain control signal GN includes the two separate portions $GN_1$ and $GN_2$ that are implemented to separately control the variable amplifier stages (e.g., the variable amplifier stages 112 and 118). As an example, the two separate variable amplifier stages 112 and 118 can be arranged in a cascaded manner and separately controlled by the respective portions $GN_1$ and $GN_2$ of the digital gain control signal GN to achieve a greater open loop gain bandwidth to achieve greater output linearity at the resonating frequency of the resonator of the sensor system 52, and thus the frequency of the capacitive pickoff signal $PO_X$. However, it is to be understood that a single variable amplifier stage with a singular control via the digital gain control signal GN, or additional variable amplifier stages, can be implemented instead in the example of FIG. 3.

As an example, the digital gain control signal GN can provide the first and second portions at a first value to implement high gain of the respective pickoff signal $PO_X$, such as to achieve a high resolution of the capacitive pickoff signal $PO_X$ via the digital pickoff signal $DIG_X$. However, the gyroscope controller 14 can monitor the amplitude of the digital pickoff signal $DIG_X$ to provide feedback control of the gain and resolution of the digital pickoff signal $DIG_X$. For example, in response to an amplitude of the fourth amplified pickoff voltage $V_{FVA3}$ increasing to an approximate saturation amplitude of the ADC 130, as detected via the digital pickoff signal $DIG_X$, the gyroscope controller 14 can decrease the gain of the variable amplifier stages 112 and 118 via the respective portions $GN_1$ and $GN_2$ of the digital gain control signal GN. Accordingly, the gyroscope controller 14 can control the gain of the gain stage 104 with respect to the digital pickoff signal $DIG_X$ to determine rotation of the sensor system 52 about the input axis, as described in greater detail herein.

As described previously, the digital pickoff signal $DIG_X$ corresponds to a digital indication of the capacitance of the resonator(s) of the sensor system 52 with respect to the electrode(s) 62, 64, 66 or 68 to track the oscillatory motion of the resonator(s). Therefore, the digital pickoff signal $DIG_X$ can also be implemented by the gyroscope controller 14 to detect changes in the oscillatory motion of the resonator(s) which can correspond to rotation of the sensor system 52 about the sensitive axis. The gyroscope controller 14 can thus generate the feedback signal FB for a different sensor system (e.g., corresponding to a set of sensors arranged orthogonally with respect to the set of sensors coupled to the sensor channel 110) based on the digital pickoff signal $DIG_X$. The feedback signal FB can thus be implemented for providing force-rebalance of the resonator(s) based on the digital pickoff signal $DIG_X$. As one example, the gyroscope controller 14 can determine the rotation of the sensor system 52 about the sensitive axis based on the feedback signal FB, and thus based on the amount of force-rebalance necessary to provide the expected steady-state pickoff of the resonator(s) indicated by the digital pickoff signal $DIG_X$, such as in a high-gain mode of the gain stage 104, as provided by the digital gain control signal GN (e.g., the first and second portions $GN_1$ and $GN_2$). As another example, the gyroscope controller 14 can determine the rotation of the sensor system 52 about the sensitive axis based on the digital pickoff signal $DIG_X$ in a non-feedback manner, such as in a low-gain mode of the gain stage 104, as provided by the digital gain control signal GN (e.g., the first and second portions $GN_1$ and $GN_2$). Therefore, the gyroscope controller 14 can determine the rotation of the sensor system 52 about the sensitive axis in either the low-gain mode or the high-gain mode while adaptively adjusting the gain to accommodate the open-loop bandwidth and output linearity of the gain stage 104.

FIG. 4 illustrates an example of a forcer stage 150. The forcer stage 150 is designated as part of the Yth sensor system of the plurality N of sensor systems 16 in the example of FIG. 1 to provide a sinusoidal forcer voltage $V_{FY}$. As an example, the Yth sensor system 16 can correspond to a sensor system 16 that is associated with a set of electrodes 20 that is orthogonal with respect to the Xth sensor system 16 in the example of FIG. 3, and can correspond to the forcer stage 80 in the example of FIG. 2. Therefore, reference is to be made to the examples of FIGS. 1-3 in the following description of the example of FIG. 4.

The forcer stage 150 includes a variable reference voltage generator 152 and a field-programmable gate array (FPGA) 154. The variable reference voltage generator 152 is configured to generate a variable reference voltage $V_{REF}$ that drives the FPGA 154. In the example of FIG. 4, the variable reference voltage generator 152 provides the variable reference voltage $V_{REF}$ based on a rail voltage $V_{CC}$ and based on a control voltage $V_{CTL}$ that is provided from a digital potentiometer 156. The digital potentiometer 156 interconnects the variable reference voltage $V_{REF}$ and a low-voltage rail (e.g., ground) and is controlled by a digital feedback signal $FB_F$ that can correspond to a first portion of the digital feedback signal $FB_Y$. Therefore, the digital potentiometer 156 acts as a voltage-divider with respect to the variable reference voltage $V_{REF}$ to provide the control voltage $V_{CTL}$.

The FPGA 154 is configured to generate a sinusoidal voltage $V_S$ based on the variable reference voltage $V_{REF}$ and based on the clock signal CLK. As an example, the clock signal CLK can have a frequency that is an integer harmonic of the natural resonance frequency of the resonator(s) of the sensor system 52. As described in greater detail herein, the sensor controller 16 that includes the forcer stage 150 can be set to the forcer mode based on the gyroscope controller 14 providing the clock signal CLK to the FPGA 154. As another example, the gyroscope controller 14 can provide phase control of the sinusoidal forcer voltage $V_{FY}$ based on providing the clocks signal CLK to the FPGA 154 at an appropriate time to generate the sinusoidal voltage $V_S$, and thus the sinusoidal forcer voltage $V_{FY}$, at a desired phase. The FPGA 154 can thus be configured to provide sinusoidal voltage $V_S$ via a capacitor array based on the clock signal CLK and having an amplitude based on the variable reference voltage $V_{REF}$.

In the example of FIG. 4, the capacitor array is formed from capacitors $C_{P1}$ through $C_{P6}$ that provide the positive portions of the sinusoidal voltage $V_S$ and capacitors $C_{N1}$ through $C_{N6}$ that provide the negative portions of the sinusoidal voltage $V_S$. As an example, the capacitors $C_{N1}$ through $C_{N6}$ and $C_{P1}$ through $C_{P6}$ can be sized in a numerically descending manner for sequential activation to construct the sinusoid of the sinusoidal voltage $V_S$. As another example, the capacitors $C_{N1}$ through $C_{N6}$ and $C_{P1}$ through $C_{P6}$ can be sized such that the capacitance values are weighted in a sinusoidal fashion. Therefore, in response to the outputs of the FPGA 154 being switched in a predetermined sequence, the charges from the capacitors $C_{N1}$ through $C_{N6}$ and $C_{P1}$ through $C_{P6}$ are transferred to generate the sinusoidal voltage $V_S$ according to the sinusoidally-weighted capacitor values. Therefore, the sinusoidal voltage $V_S$ is generated in a stepped sinusoidal manner, such as with high spectral purity in a frequency band above the fundamentally generated frequency as a function of the number of capacitors (e.g., the sinusoidal steps) used in the input array. The amplitude stability of the generated sinusoidal voltage $V_S$ depends upon the ratio of the feedback capacitor $C_2$ and the capacitors $C_{N1}$ through $C_{N6}$ and $C_{P1}$ through $C_{P6}$, which can be designed and implemented to be very stable over time and temperature such that high accuracy requirements can be met.

The sinusoidal voltage $V_{SA}$ is provided through a first amplifier stage 158. The first amplifier stage 158 includes an OP-AMP 160. The first amplifier stage 158 also includes a resistor $R_4$ and a capacitor $C_2$ arranged in a feedback arrangement between an output and an inverting input of the OP-AMP 160. The first amplifier stage 158 is coupled to the capacitor array at the output of the FPGA 154 at a non-inverting input of the OP-AMP 160, and is therefore configured to provide the amplified sinusoidal voltage $V_{SA}$ by means of a sinusoidal up/down accumulation in the capacitor $C_2$ of the charges transferred by the sinusoidal-scaled capacitor array (capacitors $C_{N1}$ through $C_{N6}$ and capacitors $C_{P1}$ through $C_{P6}$) while the FPGA 154 is sequentially switching the outputs connected to the capacitor array between the reference voltage $V_{REF}$ and the low-voltage rail (e.g., ground).

The forcer stage 150 also includes a variable gain stage 162 that includes a digital potentiometer 164 and an OP-AMP 166. The digital potentiometer 164 is arranged between the voltage $V_{SA}$ and a low-voltage rail (e.g., ground), and is controlled by a digital feedback signal $FB_C$ to provide a sinusoidal voltage $V_{SVA}$ corresponding to a variably attenuated version of the amplified sinusoidal voltage $V_{SA}$. As an example, the digital feedback signal $FB_C$ can correspond to a second portion of the digital feedback signal $FB_Y$. The sinusoidal voltage $V_{SVA}$ is provided to a non-inverting input of the OP-AMP 166, with the OP-AMP 166 having an output that is coupled to the inverting input in a feedback manner. Therefore, the OP-AMP 166 is configured to provide the sinusoidal forcer voltage $V_{FY}$ as a buffered version of the sinusoidal voltage $V_{SVA}$.

As described previously, the digital feedback signal $FB_F$ can correspond to a first portion of the digital feedback signal $FB_Y$, and the digital feedback signal $FB_C$ can correspond to a second portion of the digital feedback signal $FB_Y$. As an example, based on the effect of the variations of the digital feedback signal portions $FB_F$ and $FB_C$, the first digital portion $FB_F$ can correspond to a fine adjustment of the amplitude of the sinusoidal forcer voltage $V_{FY}$ and the second digital portion $FB_C$ can correspond to a coarse adjustment of the amplitude of the sinusoidal forcer voltage $V_{FY}$. As described previously, the gyroscope controller 14 can be configured to generate the digital feedback signal $FB_Y$ based on the digital pickoff voltage $DIG_X$ that is associated with a pickoff voltage $PO_X$ from a set of electrodes (e.g., the electrodes 64) that are orthogonal with respect to the electrodes (e.g., the electrodes 62) to which the sinusoidal forcer voltage $V_{FY}$ is applied. Therefore, the sinusoidal forcer voltage $V_{FY}$ can be provided to the respective set of electrodes (e.g., the electrodes 62) to provide a force-rebalance of the resonator(s) 18 to a steady-state (e.g., non-rotation of the sensor system 52 about the sensitive axis). The gyroscope controller 14 can thus generate the digital feedback signal $FB_Y$, and thus the respective portions $FB_F$ and $FB_C$, to provide the necessary amplitude of the sinusoidal forcer voltage $V_{FY}$ for force-rebalance.

Additionally, the gyroscope controller 14 can be configured to determine the rotation (e.g., rotation rate) of the sensor system 52 about the sensitive axis based on the determination of the necessary amplitude of the sinusoidal forcer voltage $V_{FY}$ for steady state force-rebalance. For example, the gyroscope controller 14 can determine the rotation based on one or a combination of all of the sinusoidal forcer voltages $V_F$ that are provided from the respective sensor systems 16 that operate in the forcer mode, such as during a high-gain mode associated with the respective gain stage (e.g., the gain stage 104) of the sensing controller 16 corresponding to the set of pickoff electrodes 20 arranged orthogonally with respect to the forcer electrodes 20 to which the sinusoidal forcer voltage $V_{FY}$ is applied. However, during the low-gain mode of the respective gain stage, such as based on saturation of the respective ADC 130, the gyroscope controller 14 can maintain generation of the sinusoidal forcer voltage $V_{FY}$, but can determine rotation of the sensor system 52 based on the digital pickoff signal $DIG_X$.

As described previously, the gyroscope controller 14 can be configured to selectively control the modes of the sensor systems 16 to operate in either the forcer mode or the sensing mode. As an example, the gyroscope controller 14 can be configured to selectively provide the clock signal CLK to the FPGA 154 to set the respective sensor controller 16 that includes the forcer stage 150 to the forcer mode, or can cease providing the clock signal to the FPGA 154 to set the respective sensor controller 16 that includes the forcer stage 150 to the sensing mode. As another example, the gyroscope controller 14 can set the digital feedback signal $FB_Y$ to a value that corresponds to an approximately zero amplitude of the sinusoidal forcer voltage $V_{FY}$ (e.g., via the first and/or second portions $FB_F$ and/or $FB_C$, respectively). Therefore, the gyroscope controller 14 can alternate the sensor controllers 16 that operate in the sensing and forcer modes, such as during real-time operation and/or in a calibration procedure, without using analog switches that can be ineffective in harsh environments (e.g., space).

As an example, the forcer stage 150 can provide the sinusoidal forcer voltage $V_{FY}$ to a first amplifier stage of an associated gain stage of the respective sensor system 16 to provide the force-rebalance of the resonator(s) 18. For example, referring to the example of FIG. 3, in response to the forcer stage 102 being set to the forcer mode via the clock signal CLK, the forcer stage 102 provides the sinusoidal forcer voltage $V_F$ to the first amplifier stage 106 via the non-inverting input of the OP-AMP 108. The OP-AMP 108 thus provides an amplified version of the sinusoidal forcer voltage $V_F$ to the respective sensor channel 110 via the feedback arrangement of the resistor $R_1$ and the capacitor $C_1$. As described previously, when the respective sensor controller 16 is set to the forcer mode, the gyroscope controller 14 can ignore the digital pickoff signal $DIG_X$. Therefore, the sensor system 100 can be set to either the forcer mode or the sensing mode based on the amplitude of the sinusoidal forcer voltage $V_F$ (e.g., based on the presence or absence of the clock signal CLK).

Accordingly, described herein is a CVG sensor system 10 that exhibits simple digital control. The digital control of the CVG sensor system 10 allows for high-resolution, low-cost, greater efficiency, and simpler configurability relative to other typical CVG sensor systems. Additionally, the CVG sensor system 10 can provide for variation in operation of the electrodes between use for pickoff and use for force-rebalance based on the selectivity of the sensor controllers 16 between the forcer mode and the pickoff mode. By implementing the selectivity of the sensor controllers 16 between the forcer mode and the pickoff mode based on providing the digital clock signal CLK or not providing the digital clock signal CLK, the CVG sensor system 10 can operate in harsh environments (e.g., space) that can prohibit the use of analog switches for providing such selectivity.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for controlling a CVG system (e.g., the CVG system 10). At 202, a capacitive pickoff voltage (e.g., the capacitive pickoff voltage PO) associated with oscillatory motion of a resonator (e.g., the resonator(s) 18) of a CVG sensor system (e.g., the sensor system 12) is monitored at each of a first portion of a plurality of sensor controllers (e.g., the sensor controller(s) 16) that are coupled to a respective set of electrodes (e.g., the electrodes 20) associated with the CVG sensor system via a respective first portion of a plurality of sensor channels (e.g., the sensor channels 22) to generate a digital pickoff signal (e.g., the digital pickoff voltage DIG). At 204, a digital feedback signal (e.g., the digital feedback signal FB) is generated based on the digital pickoff signal received via each of the first portion of the plurality of sensor controllers. At 206, the digital feedback signal and a digital clock signal (e.g., the digital clock signal CLK) is provided to each of a second portion of the plurality of sensor controllers to generate a sinusoidal forcer signal (e.g., the sinusoidal forcer voltage $V_F$) on the respective second portion of the plurality of sensor channels to provide the oscillatory motion of the resonator. At 208, a rotation about the CVG sensor system is determined based on at least one of the digital feedback signal and the digital pickoff signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A Coriolis vibratory gyroscope (CVG) control system comprising:

a plurality of sensor controllers that are each coupled to a respective set of electrodes associated with a CVG sensor system via one of a respective plurality of sensor channels, a first portion of the plurality of sensor controllers being configured to provide a sinusoidal forcer signal on the respective one of the plurality of sensor channels in response to a digital clock signal and a digital feedback signal to provide oscillation of a resonator associated with the CVG sensor system, a second portion of the plurality of sensor controllers being configured to monitor a capacitive pickoff voltage associated with the resonator of the CVG sensor system on the respective one of the plurality of sensor channels to generate a digital pickoff signal; and a gyroscope controller configured to generate the digital feedback signal in response to the digital pickoff signal from the second portion of the plurality of sensor controllers and to provide the digital feedback signal and the digital clock signal to the first portion of the plurality of sensor controllers, the gyroscope controller also being configured to determine a rotation about the CVG sensor system based on at least one of the digital feedback signal and the digital pickoff signal.

2. The system of claim 1, wherein the plurality of sensor controllers are configured as a plurality of pickoff/forcer controllers that are arranged substantially the same with respect to each other, wherein the first portion of the plurality of pickoff/forcer controllers is configured to provide the sinusoidal forcer signal on the respective one of the plurality of sensor channels in response to the digital clock signal and the digital feedback signal in a forcer mode, wherein the second portion of the plurality of pickoff/forcer controllers is configured to monitor the capacitive pickoff voltage on the respective one of the plurality of sensor channels to generate the digital pickoff signal in a sensing mode, wherein the gyroscope controller is configured to selectively switch the plurality of pickoff/forcer controllers between the forcer mode and the sensing mode.

3. The system of claim 2, wherein each of the plurality of sensor controllers comprises:
a gain stage comprising an amplifier stage that is coupled to the respective one of the plurality of sensor channels, the amplifier stage being configured to monitor the capacitive pickoff voltage on the respective one of the plurality of sensor channels to generate the digital pickoff signal in the sensing mode; and
a forcer stage coupled to the amplifier stage, the forcer stage being configured to generate the sinusoidal forcer signal in response to the digital feedback signal and the digital clock signal, and to provide the sinusoidal forcer signal to the amplifier stage to provide the sinusoidal forcer signal on the respective one of the plurality of sensor channels in the forcer mode.

4. The system of claim 3, wherein the amplifier stage is a first amplifier stage, the gain stage further comprising:
at least one programmable gain stage configured to generate a variable gain amplified pickoff voltage based on an amplified pickoff voltage provided by the first amplifier stage in response to a digital gain control signal provided by the gyroscope controller; and
an analog-to-digital converter (ADC) configured to generate the digital pickoff signal based on the variable gain amplified pickoff voltage.

5. The system of claim 3, wherein the forcer stage comprises:
a field-programmable gate array (FPGA) configured to generate a sinusoidal signal via a sinusoidally-weighted capacitor array in response to the digital clock signal and a variable reference voltage controlled via a fine adjustment portion of the digital feedback signal;
a second amplifier stage configured to amplify the sinusoidal signal to generate an amplified sinusoidal signal; and
a variable amplifier stage configured to generate the sinusoidal forcer signal based on the amplified sinusoidal signal and in response to a coarse adjustment portion of the digital feedback signal.

6. The system of claim 1, wherein the second portion of the plurality of sensor controllers comprises:
a first amplifier stage coupled to the respective one of the plurality of sensor channels, the first amplifier stage being configured to generate an amplified pickoff voltage based on the capacitive pickoff voltage;
at least one programmable gain stage configured to generate a variable gain amplified pickoff voltage based on the amplified pickoff voltage in response to a digital gain control signal provided by the gyroscope controller; and
an analog-to-digital converter (ADC) configured to generate the digital pickoff signal based on the variable gain amplified pickoff voltage.

7. The system of claim 6, wherein at least one programmable gain stage comprises:
a first programmable gain stage coupled to the first amplifier stage and comprising a first variable resistor and a first operational amplifier, the first variable resistor being controlled by a first portion of the digital gain control signal; and
a second programmable gain stage coupled to the first programmable gain stage and comprising a second variable resistor and a second operational amplifier, the second variable resistor being controlled by a second portion of the digital gain control signal.

8. The system of claim 6, wherein the second portion of the plurality of sensor controllers further comprises an offset amplifier stage configured to provide level-shifting of the variable gain amplified pickoff voltage with respect to an input of the ADC.

9. The system of claim 6, wherein the gyroscope controller is configured to determine the rotation about the CVG sensor system based on the digital feedback signal in a high gain mode associated with the at least one variable gain amplifier stage based on the digital gain control signal, wherein the gyroscope controller is also configured to monitor the digital pickoff signal and to decrease the gain of at least one programmable gain stage in a low gain mode via the digital gain control signal in response to detecting saturation of the ADC with respect to the variable gain amplified pickoff signal, the gyroscope controller being further configured to determine the rotation about the CVG sensor system based on the digital pickoff signal in the low gain mode.

10. The system of claim 1, wherein the second portion of the plurality of sensor controllers comprises:
a field-programmable gate array (FPGA) configured to generate a sinusoidal signal via a sinusoidally-weighted capacitor array in response to the digital clock signal and a variable reference voltage controlled via a fine adjustment portion of the digital feedback signal;
a first amplifier stage configured to amplify the sinusoidal signal to generate an amplified sinusoidal signal; and
a variable amplifier stage configured to generate the sinusoidal forcer signal based on the amplified sinusoidal signal and in response to a coarse adjustment portion of the digital feedback signal.

11. The system of claim 10, wherein the second portion of the plurality of sensor controllers further comprises:
a variable voltage source configured to generate the variable reference voltage based on a high-voltage rail; and
a digital potentiometer configured to provide a control voltage to the variable voltage source based on the variable reference voltage in a feedback manner in response to the fine adjustment portion of the digital feedback signal.

12. The system of claim 10, wherein the variable amplifier stage comprises a digital potentiometer interconnecting the amplified sinusoidal signal and an operational amplifier arranged in a feedback manner and configured to generate the sinusoidal forcer signal, the digital potentiometer being controlled via the coarse adjustment portion of the digital feedback signal.

13. A method for controlling a CVG system, the method comprising:
    monitoring a capacitive pickoff voltage associated with oscillatory motion of a resonator of a CVG sensor system at each of a first portion of a plurality of sensor controllers that are coupled to a respective set of electrodes associated with the CVG sensor system via a respective first portion of a plurality of sensor channels to generate a digital pickoff signal;
    generating a digital feedback signal via a gyroscope controller based on the digital pickoff signal received via each of the first portion of the plurality of sensor controllers;
    providing the digital feedback signal and a digital clock signal from the gyroscope controller to each of a second portion of the plurality of sensor controllers to generate a sinusoidal forcer signal on the respective second portion of the plurality of sensor channels to provide the oscillatory motion of the resonator; and
    determining a rotation about the CVG sensor system via the gyroscope controller based on at least one of the digital feedback signals and the digital pickoff signal.

14. The method of claim 13, wherein the plurality of sensor controllers are configured as a plurality of pickoff/forcer controllers that are arranged substantially the same with respect to each other, such that the first portion of the plurality of pickoff/forcer controllers operate in a sensing mode and the second portion of the plurality of pickoff/forcer controllers operate in a forcer mode, the method further comprising selectively switching the plurality of pickoff/forcer controllers between the forcer mode and the sensing mode.

15. The method of claim 13, further comprising:
    providing a digital gain control signal to at least one programmable gain stage associated with each of the first portion of the plurality of sensor controllers to generate a variable gain amplified pickoff voltage based on the capacitive pickoff voltage; and
    generating the digital pickoff signal based on the variable gain amplified pickoff voltage via an analog-to-digital converter (ADC).

16. The method of claim 13, wherein providing the digital feedback signal comprises:
    providing a fine adjustment portion of the digital feedback signal to a digital potentiometer to control an amplitude of a variable reference voltage to a field-programmable gate array (FPGA) configured to generate a variable amplitude sinusoidal signal via a sinusoidally-weighted capacitor array in response to the digital clock signal and the variable reference voltage; and
    providing a coarse adjustment portion of the digital feedback signal to a variable amplifier stage configured to generate the sinusoidal forcer signal based on the sinusoidal signal.

17. A Coriolis vibratory gyroscope (CVG) control system comprising:
    a plurality of pickoff/forcer controllers that are each coupled to a respective set of electrodes associated with a CVG sensor system via a respective plurality of sensor channels, a first portion of the plurality of pickoff/forcer controllers being configured to provide a sinusoidal forcer signal on the respective one of the plurality of sensor channels in response to a digital clock signal and a digital feedback signal to provide oscillation of a resonator associated with the CVG sensor system in a forcer mode, a second portion of the plurality of pickoff/forcer controllers being configured to monitor a capacitive pickoff voltage associated with the resonator of the CVG sensor system on the respective one of the plurality of sensor channels to generate a digital pickoff signal in a sensing mode; and
    a gyroscope controller configured to generate the digital feedback signal in response to the digital pickoff signal from the second portion of the plurality of pickoff/forcer controllers and to provide the digital feedback signal and the digital clock signal to the first portion of the plurality of pickoff/forcer controllers, to determine a rotation about the CVG sensor system based on at least one of the digital feedback signal and the digital pickoff signal, and to selectively switch the plurality of pickoff/forcer controllers between the forcer mode and the sensing mode.

18. The system of claim 17, wherein each of the plurality of pickoff/forcer controllers comprises:
    a gain stage comprising an amplifier stage that is coupled to the respective one of the plurality of sensor channels, the amplifier stage being configured to monitor the capacitive pickoff voltage on the respective one of the plurality of sensor channels to generate the digital pickoff signal in the sensing mode; and
    a forcer stage coupled to the amplifier stage, the forcer stage being configured to generate the sinusoidal forcer signal in response to the digital feedback signal and the digital clock signal, and to provide the sinusoidal forcer signal to the amplifier stage to provide the sinusoidal forcer signal on the respective one of the plurality of sensor channels in the forcer mode.

19. The system of claim 18, wherein the amplifier stage is a first amplifier stage, the gain stage further comprising:
    at least one programmable gain stage configured to generate a variable gain amplified pickoff voltage based on an amplified pickoff voltage provided by the first amplifier stage in response to a digital gain control signal provided by the gyroscope controller; and
    an analog-to-digital converter (ADC) configured to generate the digital pickoff signal based on the variable gain amplified pickoff voltage.

20. The system of claim 18, wherein the forcer stage comprises:
    a field-programmable gate array (FPGA) configured to generate a sinusoidal signal via a sinusoidally-weighted capacitor array in response to the digital clock signal and a variable reference voltage controlled via a fine adjustment portion of the digital feedback signal;
    a second amplifier stage configured to amplify the sinusoidal signal to generate an amplified sinusoidal signal; and
    a variable amplifier stage configured to generate the sinusoidal forcer signal based on the amplified sinusoidal signal and in response to a coarse adjustment portion of the digital feedback signal.

* * * * *